(12) United States Patent
Kitahara et al.

(10) Patent No.: US 10,760,768 B2
(45) Date of Patent: Sep. 1, 2020

(54) OPTICAL DEVICE AND ILLUMINATION DEVICE

(71) Applicant: NICHIA CORPORATION, Anan-shi, Tokushima (JP)

(72) Inventors: Wataru Kitahara, Kamiina-gun (JP); Yoshinori Momose, Matsumoto (JP); Wataru Ogura, Suwa (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 16/453,926

(22) Filed: Jun. 26, 2019

(65) Prior Publication Data

US 2020/0018460 A1 Jan. 16, 2020

(30) Foreign Application Priority Data

Jun. 27, 2018 (JP) .................................. 2018-121626

(51) Int. Cl.

| F21V 7/00 | (2006.01) |
|---|---|
| F21V 7/04 | (2006.01) |
| G02B 3/08 | (2006.01) |
| F21V 8/00 | (2006.01) |
| F21Y 115/10 | (2016.01) |

(52) U.S. Cl.
CPC .......... *F21V 7/0025* (2013.01); *F21V 7/0091* (2013.01); *F21V 7/043* (2013.01); *G02B 3/08* (2013.01); *G02B 6/0018* (2013.01); *G02B 6/0068* (2013.01); *F21Y 2115/10* (2016.08)

(58) Field of Classification Search
CPC ............................... F21V 7/0025; F21V 7/043
USPC ......................................................... 362/243
See application file for complete search history.

(56) References Cited

U.S. PATENT DOCUMENTS

| 7,329,029 B2* | 2/2008 | Chaves .................... G02B 3/06 |
| | | 257/E33.071 |
| 2005/0024744 A1 | 2/2005 | Falicoff et al. |
| 2005/0129358 A1* | 6/2005 | Minano ................. F21S 41/322 |
| | | 385/31 |
| 2008/0291685 A1 | 11/2008 | Misawa et al. |
| 2011/0149579 A1 | 6/2011 | Chiang et al. |

FOREIGN PATENT DOCUMENTS

| EP | 1 881 265 A1 | 1/2008 |
| JP | 2012-074278 A | 4/2012 |
| WO | WO-2009/020484 A1 | 2/2009 |

* cited by examiner

*Primary Examiner* — Christopher M Raabe
(74) *Attorney, Agent, or Firm* — Foley & Lardner LLP (57) ABSTRACT

An optical device comprises: at least one first reflecting surface disposed so as to reflect first light that has a light distribution having an optical axis parallel to a first axis, to an arc-shaped first region surrounding the first axis; and a second reflecting surface and a third reflecting surface that are disposed such that the second reflecting surface and the third reflecting surface meet each other on the first axis, and such that the first reflecting surface is disposed between the second reflecting surface and the third reflecting surface.

21 Claims, 8 Drawing Sheets

OPTICAL DEVICE AND ILLUMINATION DEVICE

CROSS-REFERENCE TO RELATED APPLICATIONS

This application claims priority to Japanese Patent Application No. 2018-121626, filed on Jun. 27, 2018, the entire contents of which are incorporated herein by reference.

BACKGROUND

1. Technical Field

The present disclosure relates to an optical device suitable for illuminating a linear or a quadrangular shaped region, and an illumination device using the optical device.

2. Description of Related Art

In Japanese Patent Publication No. 2012-074278 A, an illumination device with a small number of light source modules configured to illuminate an elongated linear irradiation region is described. The illumination device in Japanese Patent Publication No. 2012-074278 A includes two rows of light source units, in which four light source units are arranged in each row. Each of the light source units includes a pair of light source modules. Each light source module distributes light emitted from a light emitting element into first emitted light radiated frontward of a base member through a light source lens, and second emitted light refracted through the light source lens, then reflected at a second reflecting plate, and radiated frontward of the base member. In the light source unit in Japanese Patent Publication No. 2012-074278 A, base members of two light source modules are arranged back to back such that the base members of the two light source modules form an acute angle, and the light source unit emits linear illumination light with a predetermined width, spreading at an angle defined by the base member of one light source module and the base member of an adjacent light source module. Therefore, an elongated linear irradiation region can be obtained by the illumination device.

SUMMARY

Light emitted from a LED generally has a Lambertian light distribution with a light distribution pattern in which the luminous intensity on an optical axis is the highest (largest). Accordingly, when illuminating a long linear-shaped irradiation region using a small number of illumination devices or densely-arranged illumination devices, light distribution is required to be controlled by densely arranging many LEDs such that angles of many optical axes are varied to disperse light along a linear shaped region to be illuminated, or by performing different complex adjustments of light illuminating the end portions of the linear shaped region and light illuminating the central portion of the linear shaped region with respect to an optical axis, which is set so as to obliquely cross the linear shaped region. Thus, an optical device configured to easily convert a Lambertian light distribution to a linear or quadrangular light distribution is desired.

An optical device according to one embodiment of the present disclosure includes a first reflecting surface disposed so as to reflect first light, which is incident along a first axis and has a light distribution having an optical axis parallel to the first axis, to an circular arc-like first region surrounding the first axis; and a second reflecting surface and a third reflecting surface that are disposed such that the second reflecting surface and the third reflecting surface meet each other on the first axis, and such that the first reflecting surface is disposed between the second reflecting surface and the third reflecting surface.

An optical device according to another embodiment of the present disclosure includes an optical element having a substantially fan shape in a plan view and including an opening at one end of a first axis perpendicular to the plane; and reflecting surfaces disposed such that the reflecting surfaces meet each other at the first axis and such that the optical element is disposed between the reflecting surfaces. In the optical device, the optical element includes a first transmitting surface, a second transmitting surface, and a third transmitting surface having fan-shapes with coaxial arcs, and intermittently and sequentially arranged along the first axis, such that an inner diameter of the optical element increases stepwise toward the opening from a side opposite to the opening, and a fourth reflecting surface, a fifth reflecting surface, and a sixth reflecting surface that have circular arcs disposed so as to be inclined at an acute angle from the first transmitting surface, the second transmitting surface and the third transmitting surface, respectively, to a side opposite to the opening.

An illumination device according to still another embodiment of the present disclosure includes the optical device, and a light source which outputs a first light.

The optical device according to the present disclosure includes reflecting surfaces (i.e., the first reflecting surface or the fourth reflecting surface and the fifth reflecting surface) arranged in a circular arc at the peripheral portion around the first axis, and reflecting surfaces (i.e., the second reflecting surface and the third reflecting surface) arranged with the reflecting surfaces disposed in a circular arc disposed therebetween, which allows light (first light) incident along a first axis and having a Lambertian light distribution to be converted into a linear or quadrangular light distribution with a more uniform luminous intensity distribution.

DETAILED DESCRIPTION

Figure 1:
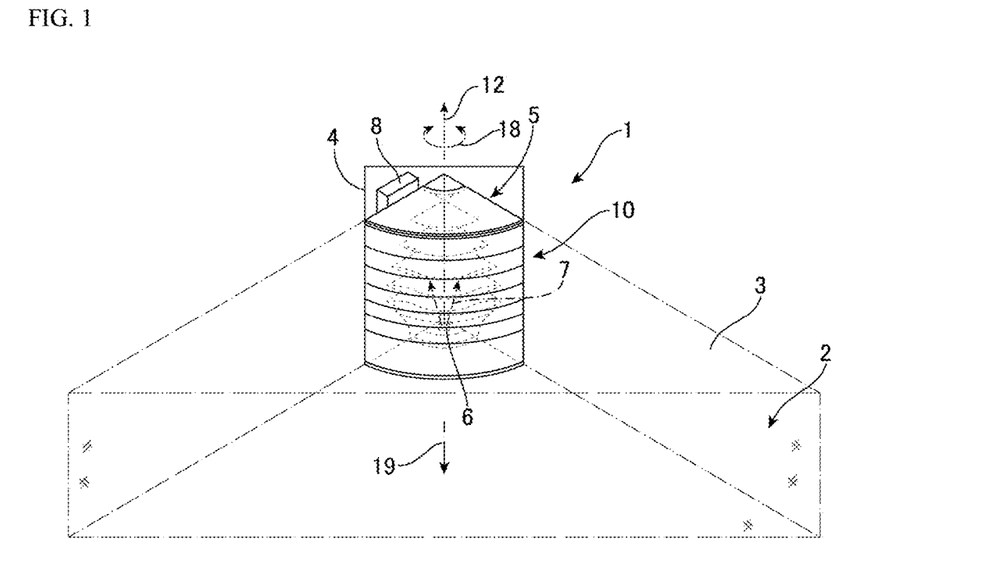
FIG. 1 is a schematic perspective view showing one example of an illumination device.

FIG. 1 shows one example of an illumination device according to the present disclosure. The illumination device 1 includes a projection unit 5 that projects to a front side 19 light (light beam) 3 controlled so as to illuminate a region 2 having a quadrangular or linear shape such as a top of a desk; a quadrangular housing 4 housing the projection unit 5; and a driver circuit 8 that drives a LED 6 serving as a light source of the projection unit 5. The projection unit 5 includes: an optical device (optical system) 10 including a light-transmissive member (optical element) 11, which spreads from a peripheral portion 18 surrounding a central axis (first axis or Z axis) 12 to have a circular arc shape and has a column-like, rod-like or cylindrical-lens like shape with a substantially fan shape (i.e., a shape of a sector) in a plan view (i.e., shape seen along an X-Y plane orthogonal to the Z axis 12); and the LED 6 that emits source light (first light) 7 so as to be incident on one end surface of the optical element 11.

Figure 2:
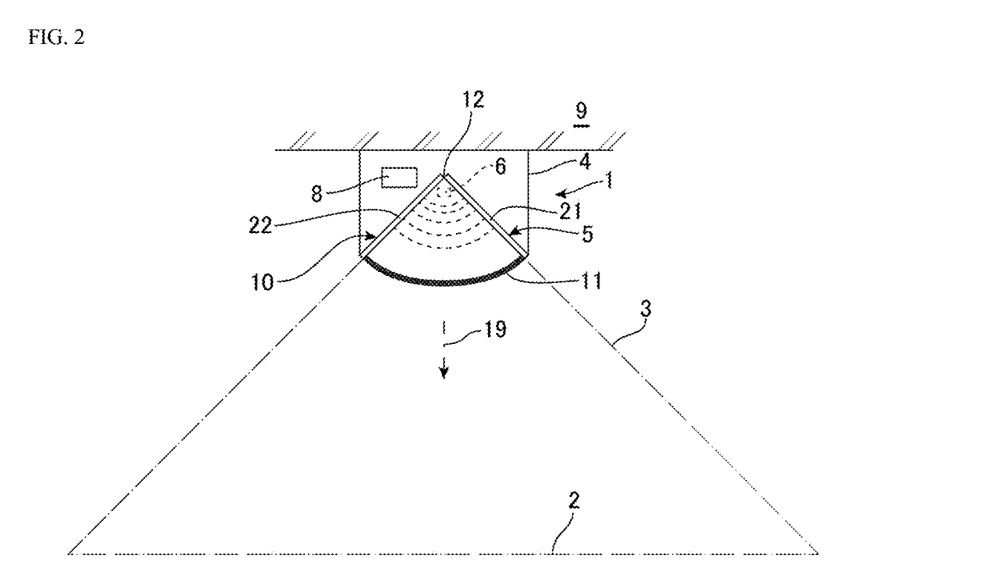
FIG. 2 is a schematic diagram of the illumination device attached to a ceiling.

As shown in FIG. 2, when attached to a ceiling 9, the illumination device 1 can concentratedly illuminate a region 2 having a quadrangular shape, such as a top of a desk, or linear narrow and long shape. The illumination target may be a region having any appropriate quadrangular or long and narrow shape. Examples of the illumination target other than a top of a desk include a wall, an indoor or outdoor signboard, and a poster.

The illumination device 1 is configured to concentratedly illuminate such a region 2 having a quadrangular shape or a narrow and long shape. The optical device 10 includes the light-transmissive member 11 having a substantially fan shape in a plan view and extending along the first axis 12, which is a center axis of the fan shape, to have a columnar shape; and reflecting members 21 and 22 arranged such that the light-transmissive member 11 is disposed between the reflecting members 21 and 22.

Figure 3A:
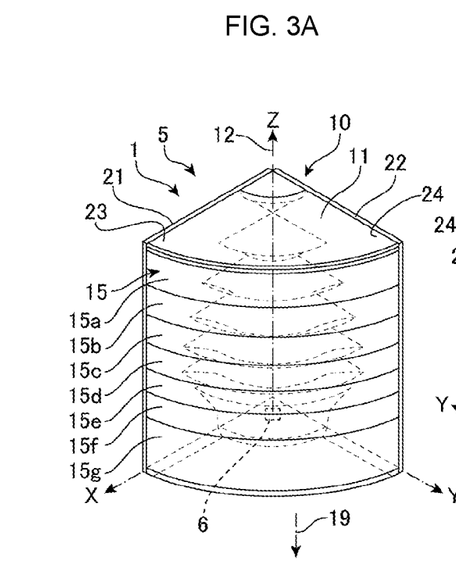
FIG. 3A is a schematic diagram showing a projection unit viewed from a front side (in an illumination direction)
Figure 3B:
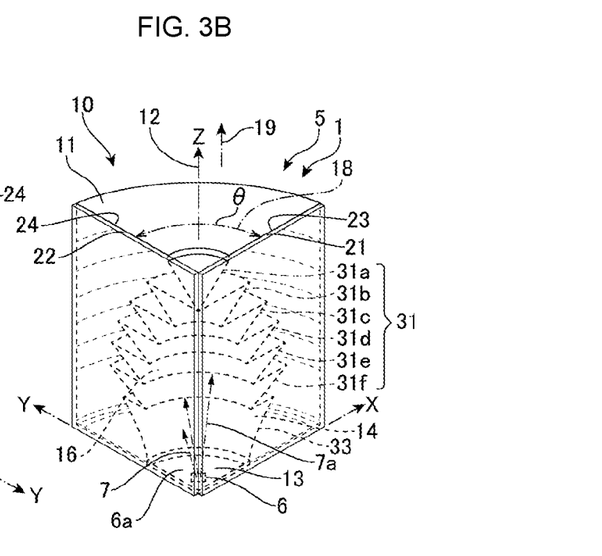
FIG. 3B is a schematic diagram of the projection unit viewed in a Z axis direction.

FIG. 3 shows the projection unit 5, which includes the optical device 10, without illustration of other components in the illumination device 1. FIG. 3A is a schematic perspective diagram of the projection unit 5 seen from the projection side (front side) 19, and FIG. 3B is a schematic perspective diagram of the projection unit 5 seen from a side opposite to the projection side 19. Further, FIG. 4 is a schematic exploded view showing the projection unit 5 and the optical device 10.

Figure 4:
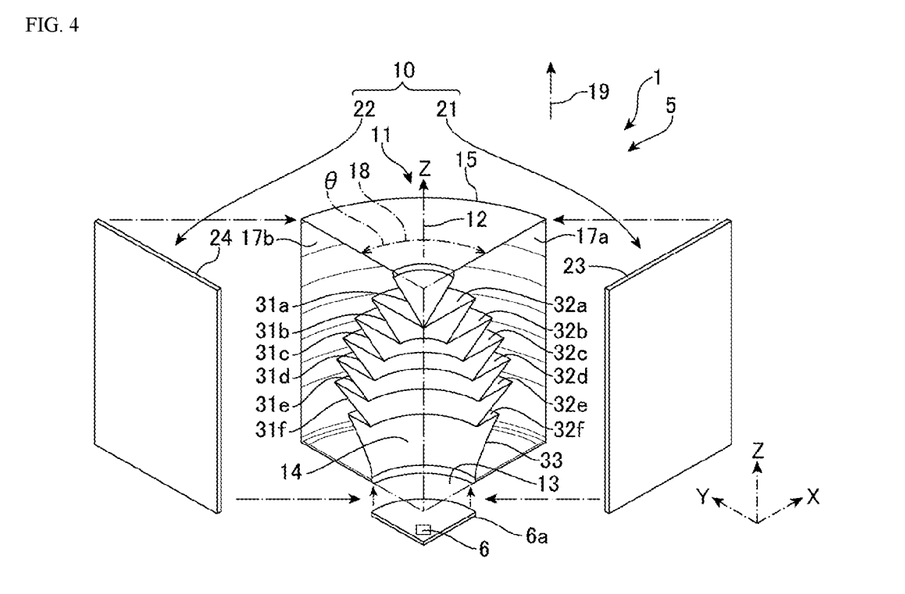
FIG. 4 is a schematic exploded view showing the projection unit.

As shown in FIG. 4, the optical device 10 includes the light-transmissive member (optical element) 11 made of a light-transmissive material, e.g., acrylic resin or glass, and having a substantially fan shape spreading from the peripheral portion surrounding the first axis (Z axis) 12, which is a central axis at an angle θ (i.e., central angle θ or spreading angle θ), when viewed along a plane orthogonal to the Z axis 12 (i.e., X-Y plane), that is, in a plan view. The optical element 11 has a columnar shape extending along the Z axis 12, in which a space 14 having an opening 13 at one end of the optical element 11 along the Z axis 12 (i.e., bottom surface side, and negative direction on the Z axis) is present at the Z axis 12 side (i.e., inner side), and a surface 15 (i.e., emission surface) at the projection side (i.e., front side, and outer side) 19 opposite to the Z axis 12 side has a substantially circular arc shape. The optical device 10 further includes reflecting members 21 and 22 arranged such that the optical element 11 is disposed between the reflecting members 21 and 22. The reflecting members 21 and 22 include reflecting surfaces 23 and 24, respectively, at a side facing the optical element 11. The reflecting surface 23 (i.e., second reflecting surface) and the reflecting surface 24 (i.e., third reflecting surface) are located so as to meet each other on the Z axis 12 and such that the optical element 11 is disposed between the reflecting surface 23 and the reflecting surface 24.

Figure 5:
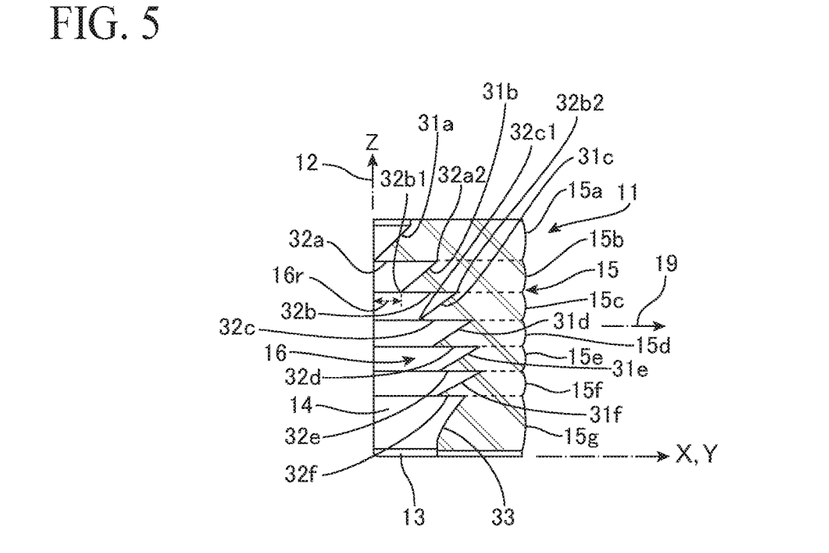
FIG. 5 is a schematic cross-sectional diagram showing a structure of an optical element.

As shown in a cross-sectional view in FIG. 5, the optical element 11 is a cylindrical lens as an entirety, with a space 14 internally formed along the Z axis 12, and includes a multi-stepped inner surface (transmitting/reflecting surface) 16 in which transmitting surfaces and reflecting surfaces are alternately arranged along the Z axis 12 from the opening 13 of the space 14. The inner surface 16 of the optical element 11 includes a plurality of fan-shaped transmitting surfaces 32 having coaxial arcs and arranged stepwise toward the opening 13 from a side opposite to the opening 13, i.e., toward the negative side from the positive side on the Z axis 12 to; and reflecting surfaces 31 (i.e., first reflecting surface) having circular arcs and alternately arranged with the transmitting surfaces 32, such that the first reflecting surface 31 spreads along the Z axis 12 so as to be inclined at an acute angle with respect to the X-Y plane. The fan-shaped transmitting surfaces 32 are arranged sequentially such that an inner diameter 16r increases toward the opening 13 from a side opposite to the opening 13, i.e., toward the negative side from the positive side on the Z axis 12.

More specifically, in the optical element 11 in this example, the first reflecting surfaces 31 include six reflecting surfaces (fourth to ninth reflecting surfaces) 31a to 31f, six transmitting surfaces (first to sixth transmitting surfaces) 32a to 32f, which are perpendicular to the Z axis 12 and parallel to the X-Y plane, toward the opening 13 from a side opposite to the opening 13 (upper side or positive direction on the Z axis), i.e., toward the negative side from the positive side on the Z axis 12. That is, the optical element 11 includes six transmitting surfaces (first to sixth transmitting surfaces) 32a to 32f and six reflecting surfaces (fourth to ninth reflecting surfaces) 31a to 31f alternately arranged toward the negative side from the positive side on the Z axis 12. The optical element 11 further includes a transmissive surface 33 having a circular arc and surrounding the Z axis 12 on a side closest to the opening 13.

Thus, the optical element 11 includes the first transmitting surface 32a, the second transmitting surface 32b, and the third transmitting surface 32c, which have fan shapes with coaxial arcs and are intermittently and sequentially arranged along the first axis (Z axis) 12 such that the inner diameter 16r increases stepwise toward the opening 13 from a side opposite to the opening 13; and the fourth reflecting surface 31a, the fifth reflecting surface 31b, and the sixth reflecting surface 31c, which have circular arcs and are arranged so as to be inclined at an acute angle with respect to the first transmitting surface 32a, the second transmitting surface 32b and the third transmitting surface 32c, respectively, to a side opposite to the opening 13.

More specifically, the first transmitting surface 32a that is farthest from the opening 13 is a fan-shaped transmitting surface with the Z axis 12 at the center. The fourth reflecting surface 31a that is farthest from the opening 13 is a surface disposed so as to reflect light transmitted through the first transmitting surface 32a to a circular arc-like region with an angle θ (i.e., first region) at the peripheral portion 18 surrounding the Z axis 12. The fourth reflecting surface 31a is a substantially fan-shaped reflecting surface located on the first transmitting surface 32a at a side opposite to the opening 13, and inclined with respect to the X-Y plane so as to form a conical shape with the Z axis 12 at the center. The fourth reflecting surface 31a reflects light 7, which has an optical axis 7a parallel to the Z axis 12, in a direction 19 perpendicular to the Z axis 12. The fifth reflecting surface 31b is a reflecting surface having a circular arc and disposed between an inner edge 32b1 of the second transmitting surface 32b and an outer edge 32a2 of the first transmitting surface 32a so as to reflect light 7 transmitted through the second transmitting surface 32b. The sixth reflecting surface 31c is a reflecting surface having a circular arc and disposed between an inner edge 32c1 of the third transmitting surface 32c and an outer edge 32b2 of the second transmitting surface 32b so as to reflect light 7 transmitted through the third transmitting surface 32c. A seventh reflecting surface 31d and an eighth reflecting surface 31e are configured similarly to the fourth transmitting surface 32d and the fifth transmitting surface 32e.

An outer surface 15 of the optical element 11 may be a cylindrical surface. In this example, the outer surface 15 is demarcated along the Z axis 12 into seven regions 15a to 15g corresponding to the reflecting surfaces 31a to 31f and the transmitting surface 33, respectively. These regions 15a to 15g of the outer surface 15 are optimized as toric surface-like free-form surfaces so that light reflected by the reflecting surfaces 31a to 31f and light transmitted through the transmitting surface 33 are more uniformly outputted.

In the optical device (i.e., optical system) 10, the second reflecting surface 23 and the third reflecting surface 24 of the reflecting members 21 and 22 are adhesively attached to lateral surfaces 17a and 17b of the cylindrical lens-like optical element 11 having a substantially fan shape in plan view.

As shown in FIGS. 3 and 4, the projection unit 5 of the illumination device 1 includes the optical device 10, and a base member 6a attached to the opening 13 of the optical element 11 of the optical device 10. The LED 6 is mounted on the base member 6a, and illuminating light 7 is emitted along the Z axis 12 from the LED 6 toward the first reflecting surfaces 31 extending from the opening 13 into the space 14 of the optical element 11 such that the light is to be parallel to the Z axis 12. The first reflecting surface 31, including reflected surfaces 31a to 31f separated from each other, is disposed such that illuminating light (first light) 7, which has a light distribution in which an optical axis 7a is parallel to the Z axis 12, is reflected to the first range of central angle θ at the peripheral portion 18 surrounding the Z axis 12. The optical device 10 has the first reflecting surface 31; and a second reflecting surface 23 and a third reflecting surface 24 that are disposed such that the second reflecting surface 23 and the third reflecting surface 24 meet each other on the Z axis 12 and such that the first reflecting surface 31 is disposed between the second reflecting surface and the third reflecting surface. The second reflecting surface 23 reflects first light 7 in a direction of the first reflecting surface 31 along the peripheral portion 18 surrounding the Z axis 12. The third reflecting surface 24 reflects light 7 emitted from the LED 6 in a direction opposite to the second reflecting surface 23 along the peripheral portion 18 surrounding the Z axis 12.

Therefore, in the optical device 10, light 7 emitted along the Z axis 12 from the LED 6, which is a light source, is reflected at each of the second reflecting surface 23 and the third reflecting surface 24, which meet each other at the central angle θ on the Z axis 12, toward the first reflecting surface 31 in the region with an angle θ. Further, in the optical device 10, the light is reflected to the region with angle θ surrounding of the Z axis 12 in a direction perpendicular to the Z axis 12 by the first reflecting surface 31, and is emitted.

The second reflecting surface 23 and the third reflecting surface 24 may be disposed such that light 7 emitted from the LED 6 can be reflected in the region with an angle θ, and the second reflecting surface 23 and the third reflecting surface 24 may be disposed at least in the vicinity of the LED 6. The reflecting surfaces 23 and 24 may be disposed meeting the first reflecting surface 31, and light 7 emitted from the LED 6 can be efficiently reflected in the direction of the first reflecting surface 31 so as not to cause leakage.

Figure 6A:
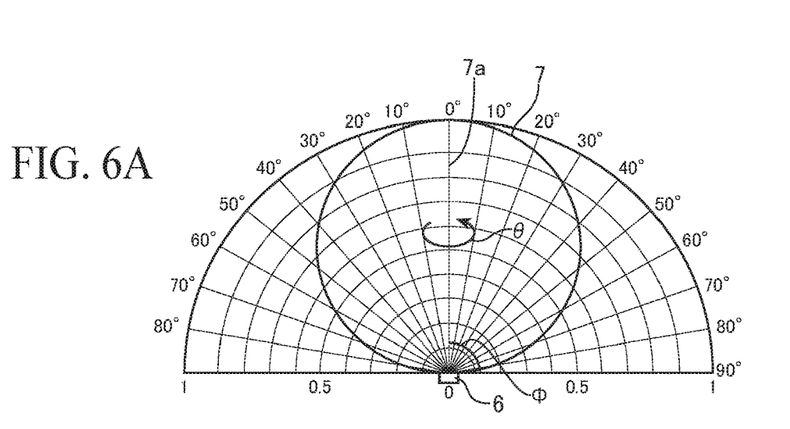
FIG. 6A is a diagram showing a light distribution of incident light.
Figure 6B:
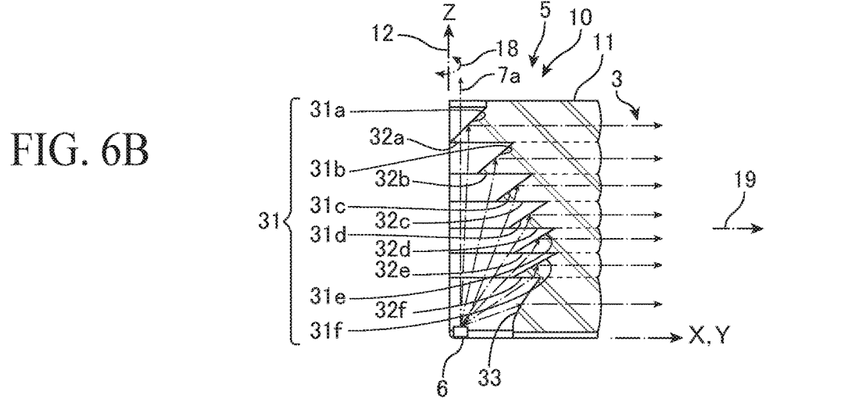
FIG. 6B is a diagram schematically showing a state in which incident light is reflected by a reflecting surface 31 of an optical element 11.

FIG. 6 schematically shows a state in which light (i.e., incident light) 7 incident on the optical element 11 of the optical device 10 along the Z axis 12 is reflected by the first reflecting surface 31, and is emitted in the direction 19 perpendicular to the Z axis 12. As shown in FIG. 6A, light 7 emitted from the LED (light source) 6 has a Lambertian light distribution, with the optical axis 7a at the center. An optical component at the peripheral portion surrounding the optical axis 7a of light 7 is reflected by the second reflecting surface 23 and the third reflecting surface 24 toward the optical element 11 having a fan shape with a central angle θ. In addition, as shown in FIG. 6B, an optical component having a light distribution angle φ with respect to the optical axis 7a of light 7 is divided into a plurality of groups (beams) by a plurality of transmitting surfaces 32a to 32f of the optical element 11 and the separated first reflecting surfaces 31a to 31f, and each beam is emitted in the direction 19 perpendicular to the optical axis 7a. Further, an optical component having a large light distribution angle φ in light 7 emitted from the LED 6 is outputted in the direction 19 perpendicular to the optical axis 7a through the transmitting surface 33 in the vicinity of the opening 13 of the optical element 11.

Therefore, the optical device 10 is configured to reflect light 7, which has a Lambertian light distribution, in a circular arc-shape in the direction 19 perpendicular to the optical axis 7a by the first reflecting surface 31, the second reflecting surface 23, and the third reflecting surface 24, which allows for converting the light 7 to illuminating light 3 having a light distribution suitable for illumination of a linear or quadrangular region. Further, with the first reflecting surface 31 reflecting light 7 in the direction 19 perpendicular to the optical axis 7a to change a direction of the light 7 to a direction perpendicular to the optical axis 7a, a portion illuminated at the same luminous intensity in the Lambertian light distribution, in which the luminous intensity varies in a range of a light distribution angle φ with respect to the optical axis 7a, can be extended to both ends of the linear or quadrangular light distribution. For example, light (light beam) having the highest luminous intensity on the optical axis 7a can be extended to both ends of the linear or quadrangular light distribution. Thus, by controlling the curvature or the inclination of the first reflecting surface, and controlling the luminous intensity in the transverse direction of the linear or quadrangular shape, a linear or quadrangular light distribution having a more uniform luminous intensity distribution can be obtained.

Figure 7A:
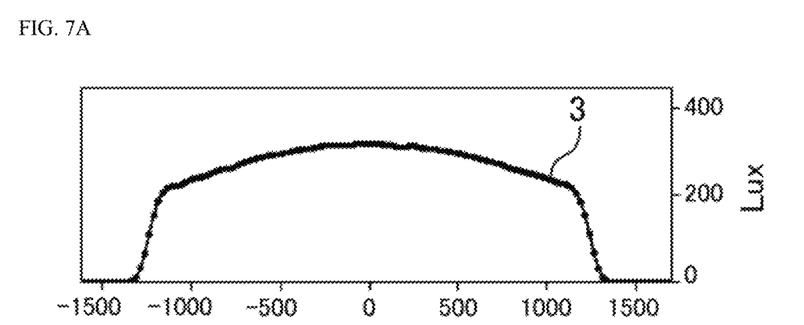
FIGS. 7A and 7B are diagrams each showing an example of a light distribution of emitted light.
Figure 7B:
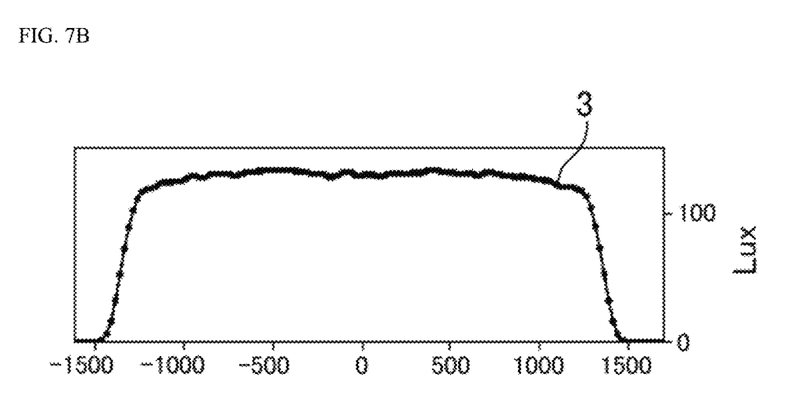

FIGS. 7A and 7B show an example of a light distribution of light 3 emitted from the projection unit 5. FIG. 7A shows one example of a light distribution when the outer surface 15 of the optical element 11 is a cylindrical surface, and FIG. 7B shows one example of a light distribution when the outer surface 15 is divided into regions 15a to 15g. With the optical device 10, light 7 emitted from the LED 6 and having a Lambertian light distribution can be converted to light 3 having a luminous intensity distribution almost uniform in a horizontal direction, and emitted. Further, with the outer surface 15 optimized using a free-form surface, the distribution of light 3 outputted from the optical device 10 can be more uniform.

Figure 8:
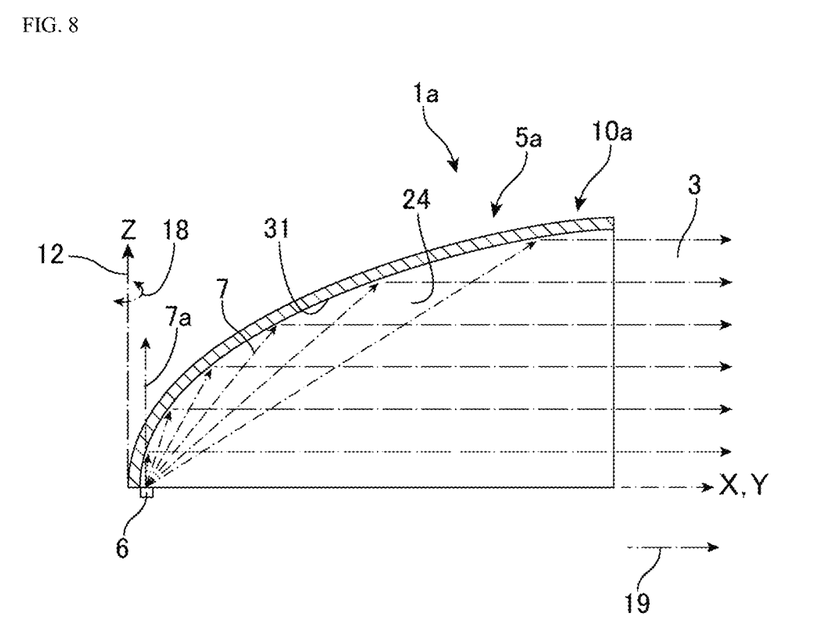
FIG. 8 is a schematic cross-sectional view showing one example of another illumination device.

FIG. 8 is a schematic cross-sectional view showing one example of the illumination device of the present disclosure. A projection unit 5a of the illumination device 1a includes an optical device 10a including a continuous first reflecting surface 31 having a substantially fan shape in plan view; and a second reflecting surface and a third reflecting surface 24 that are disposed such that the first reflecting surface 31 is disposed between the second reflecting surface and the third reflecting surface 24. In the projection unit 5a, the optical device 10a can change a direction of light 7 emitted from the LED 6 toward the Z axis 12 to the direction 19 perpendicular to the Z axis 12, so that light 7 emitted from the LED 6 can be converted to light 3 having a luminous intensity almost uniform in an angle θ direction, and outputted by the optical device 10a.

On the other hand, in the optical device 10a of the projection unit 5a employing the continuous first reflecting surface 31, an area occupied by the first reflecting surface 31 is increased, which may hinder reduction of the size of the device. In contrast, in the optical device 10 using the cylindrical-like optical element 11, the first reflecting surfaces 31 separated from one another to serve as a plurality of total-reflection surfaces 31a to 31f can be provided in a cylindrical lens, as in a Fresnel lens. That is, the optical device 10 includes a plurality of reflecting surfaces 31a to 31f that are separated in a direction along the Z axis (first axis) 12 and reflect light (first light) 7 from the LED 6 in the direction 19 perpendicular to the Z axis 12 on the peripheral portion 18 surrounding the Z axis 12. Further, the optical device 10 includes the optical element (i.e., light-transmissive member) 11 having a plurality of reflecting surfaces 31a to 31e inside the optical element, having the inner surface 16 of a multi-stepped shape including a plurality of reflecting surfaces 31a to 31f and a plurality of transmitting surfaces 32a to 32f corresponding to a plurality of reflecting surfaces 31a to 31f, respectively, and having a fan-shaped cross-section perpendicular to the Z axis (first axis) 12.

Thus, it is possible to provide a compact optical device 10 and a compact illumination device 1 using the optical device 10. Further, the optical element 11 has a plurality of reflecting surfaces 31a to 31f, and a plurality of regions (i.e., emitting surfaces) 15a to 15f of the outer surface 15, corresponding to plurality of reflecting surfaces 31a to 31f, respectively. With this structure, the plurality of reflecting surfaces and emitting surfaces can be optimized with respect to light reflected by the reflecting surfaces and light transmitted through the emitting surfaces, respectively, and it is possible to provide the optical device 10 which converts light to light 3 having a further uniform luminous intensity distribution in an angle θ direction and emits the converted light.

Each of the plurality of emitting surfaces 15a to 15f provided so as to correspond to a plurality of reflecting surfaces 31a to 31f, respectively, of the optical element 11. Each emitting surface 15a-15f may generally have a toric surface shape including a portion that is curved in a cross-section taken in a direction along the Z axis 12 as shown in FIGS. 5 and 6A. Further, a plurality of emitting surfaces 15a to 15f can have any appropriate design, and may include a portion in which the cross-section perpendicular to the Z axis 12 has a noncircular shape.

Figure 9A:
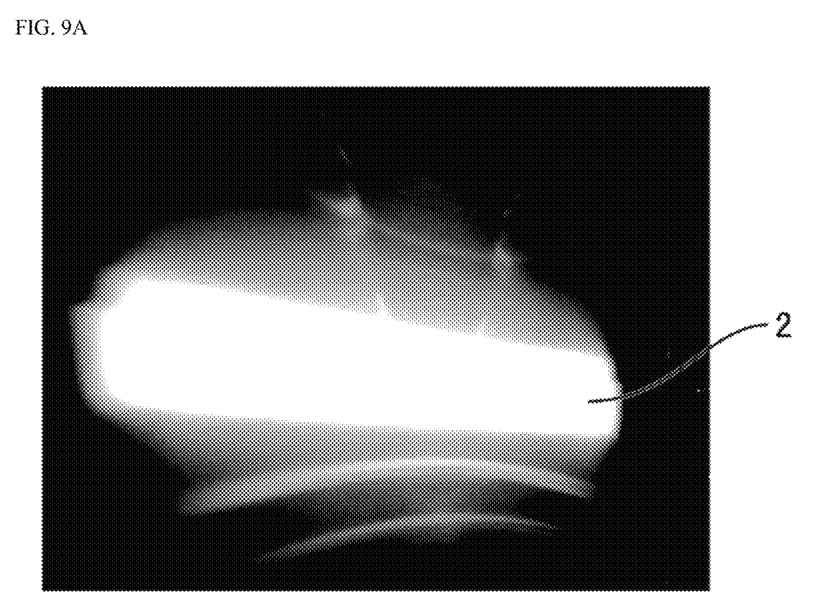
FIGS. 9A and 9B are diagrams showing an example of illumination performed by the illumination device.
Figure 9B:
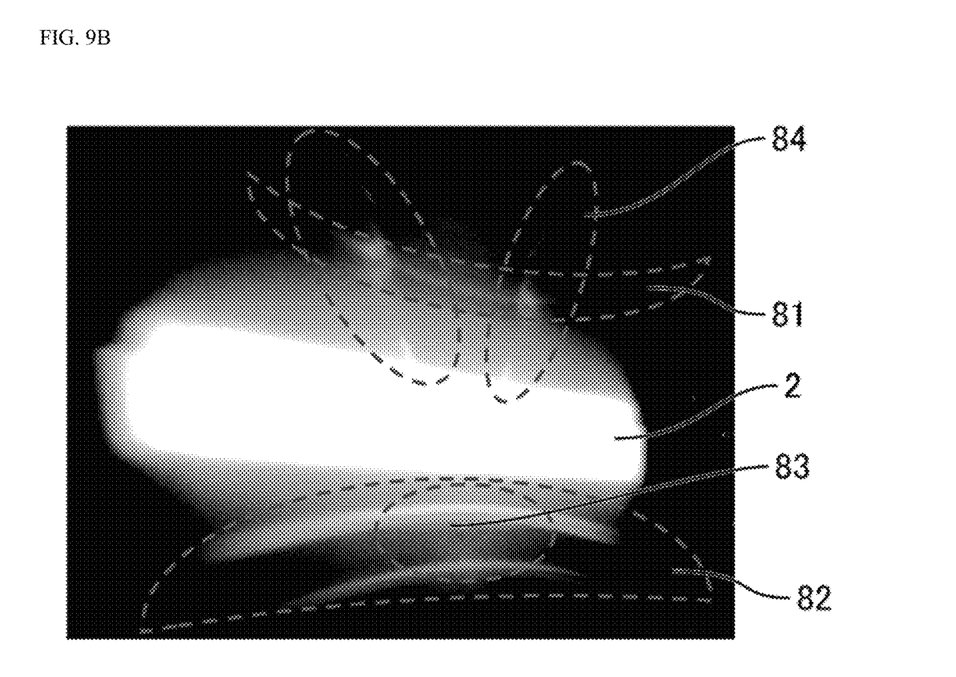

FIG. 9A shows one example in which light 3 emitted from the illumination device 1 including the projection unit 5 is projected on a screen. In this example, as shown in FIG. 9B, occurrence of a plurality of light leakages 81 to 84 was observed above and below the quadrangular illumination region 2. According to the experiments conducted by the inventors, it has been found that circular arc-like light leakages 81 to 83 are caused by stray light resulting from surface reflection at the transmitting surface 33 and the emitting surface 15g on the lowermost side of the optical element 11. The optical element 11 includes, in the lowermost step of the multi-stepped inner surface 16 at a side closest to the incident position, a surface that transmits a part of light 7 in the direction 19 perpendicular to the Z axis 12, so that an optical component having the largest light distribution angle φ in light 7 having a Lambertian light distribution can be outputted in the direction 19 perpendicular to the Z axis 12. Therefore, providing an antireflection layer or performing diffusion processing, e.g., embossing, on the inner surface 33 and/or the outer surface (i.e., emitting surface) 15g in the lowermost step of the optical element 11, which is a light-transmissive member, allows for reducing circular arc-like light leakages 81 to 83.

According to the experiments conducted by the inventors, it has been found that the angular light leakage 84 is caused by internal reflection at lateral surfaces 17a and 17b of the optical element 11. Therefore, with end surfaces 17a and 17b at both sides in a direction around the Z axis 12 in the optical element 11 subjected to antireflection or diffusion processing, occurrence of the light leakage 84 can be prevented. More specifically, with the end surfaces 17a and 17b colored black, or provided with an embossed surface, occurrence of the light leakage 84 can be prevented.

Figure 10:
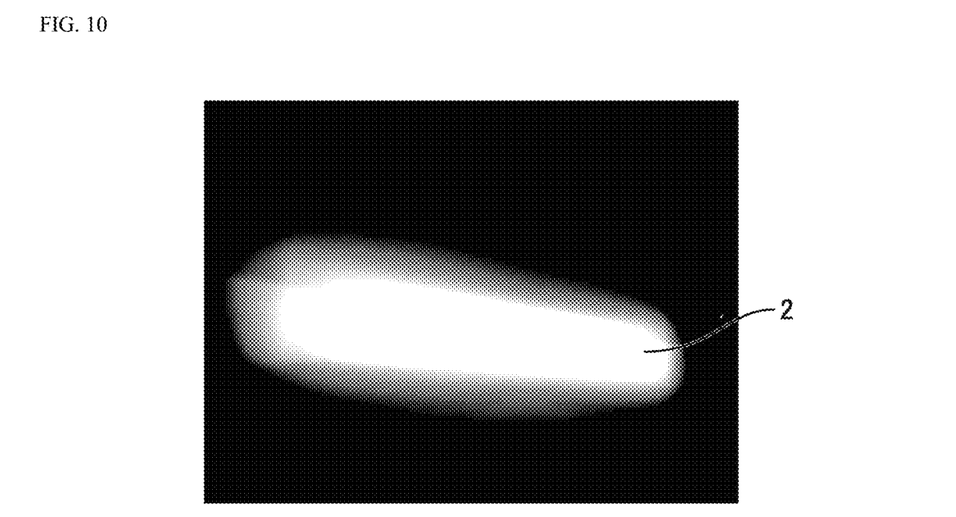
FIG. 10 is a diagram of another example of illumination performed by the illumination device.

FIG. 10 shows an example in which light 3 from the illumination device 1 using the optical element 11 subjected to the above-mentioned processing. In FIG. 10, little light leakage is observed, and it is apparent that occurrence of light leakage was reduced due to the processing described above.

Figure 11A:
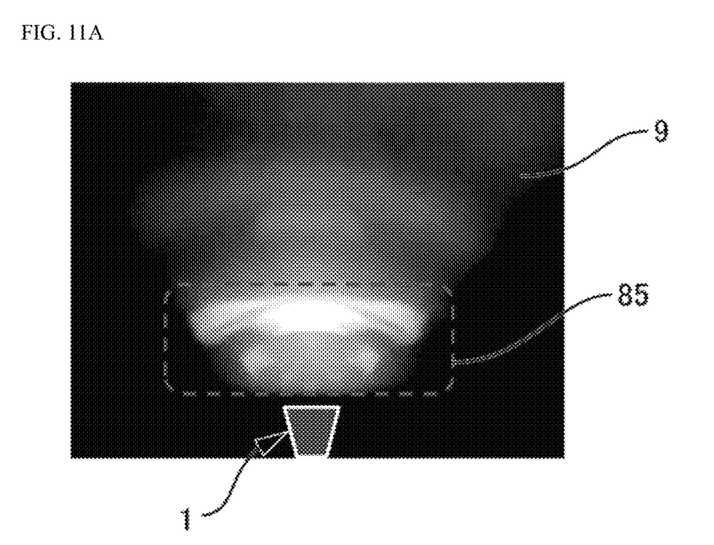
FIGS. 11A and 11B are diagrams showing another example of illumination of the illumination device.

FIG. 11A shows one example of stray light 85 which may appear on the periphery of the illumination device 1, e.g., the ceiling 9. The stray light 85 may be generated by reflected light at the reflection surface 31 and the transmitting surface 32 of the inner surface 16 of the optical element 11.

Figure 11B:
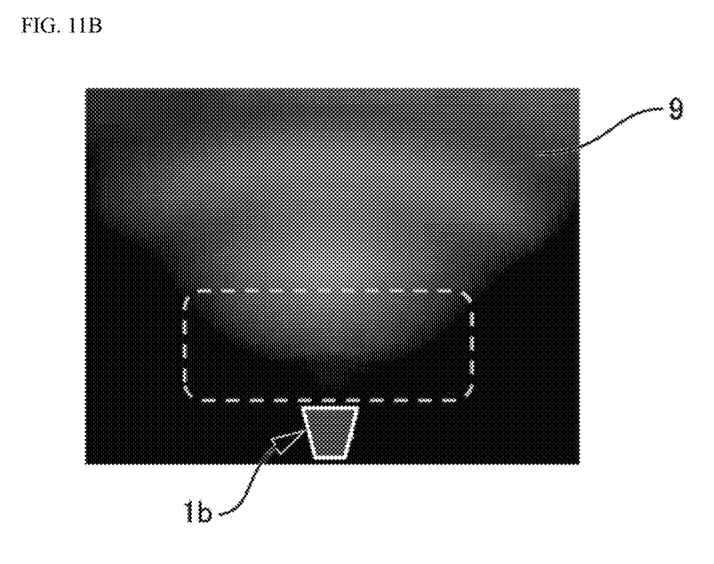
Figure 12:
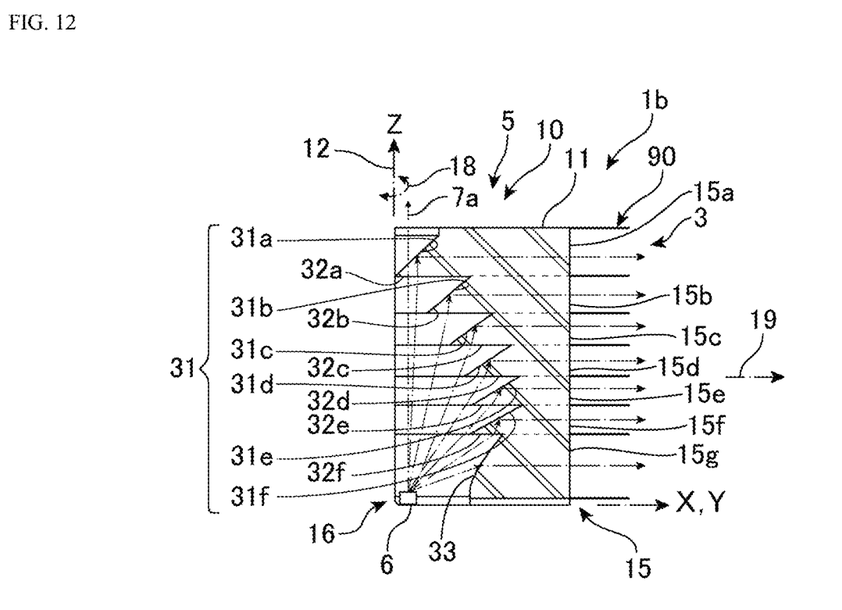
FIG. 12 is a cross-sectional diagram showing one example of still another illumination device.

FIG. 12 shows one example of another illumination device 1b. In the illumination device 1b, a plurality of louvers (i.e., shielding plates) 90 disposed at boundaries of layers (i.e., regions) 15a to 15g is provided on the front side 19 of the outer surface (i.e., emitting surface) 15 of the optical element 11 of the illumination device 1 described above. The louvers 90 are plate-like members extending in parallel to the emission direction, i.e., parallel to the X-Y plane, from the outer surface 15 of the optical element 11 to the front side 19. In the illumination device 1b provided with the louvers 90, little stray light 85 was observed as shown in FIG. 11B.

With the louvers 90, illuminating light 3 outputted from the outer surface 15 of the optical element 11 can be more precisely parallel, so that influences of diverging light generated by stray light at the inner part of the optical element 11 can be reduced. In the illumination device 1b, a plurality of louvers 90 are separately arranged in the Z axis direction such that each louver corresponds to a respective one of layers 15a to 15g, but the plurality of louvers 90 may be arranged such that one louver corresponds to a plurality of the layers 15a to 15g, or may be arranged at predetermined intervals in the Z axis direction irrespective of the layers 15a to 15g. The interval between a plurality of louvers 90 and the amount (i.e., length) of protrusion from the outer surface 15 of the optical element 11 can be determined according to the degree of parallelism of illuminating light 3 required for illumination of the illumination region 2, the intensity and extent (angle) of diverging light as stray light from the outer surface 15 of the optical element 11, or the like. In one example, the length of the louver 90 is the same as the radius of the optical element 11 (i.e., distance between the optical axis and the outer surface). If the interval between the louvers 90 is excessively small, unevenness in luminance easily occurs at an illuminated region. If the interval between the louvers 90 is excessively large such that, for example, the louvers are mounted only on the upper and lower sides, influences of stray light are not easily hindered. Therefore, in one preferred example, the louvers 90 are provided at the intervals according to the layers 15a to 15g.

As described above, the illumination device 1 includes the rotatable lens (such as reflector, transmissive member or optical element) 11, and the optical element 11 is a circular column (i.e., circular column/rotatable body with a reduced center angle) that is unfolded in a fan shape, and the space 14, which is surrounded by surfaces parallel to lateral surfaces 17a and 17b of the optical element 11 and the incident surface (opening) 13 of the optical element 11, has reflecting surfaces 23 and 24 on surfaces parallel to lateral surfaces 17a and 17b. The LED 6 serving as a light source is disposed inside the intersection (Z axis) 12 of the surfaces 23 and 24. Therefore, while the LED 6 as a light source is disposed so as to be offset from the rotation axis (central axis or Z axis) 12 in the columnar optical element 11, light 7 emitted from the LED 6 is reflected by the reflecting surfaces 23 and 24, and light 3 is outputted from the optical element 11 as if the light source is disposed on the Z axis 12.

The optical element 11 includes emitting surfaces 15a to 15g of a circular arc portion. In addition, the optical element 11 includes the transmitting portion (i.e., curved surface inner wall) 33 at the bottom surface side (i.e., opening 13 side) of the inner part (i.e., inner surface) 16, and includes the total reflection surfaces 31a to 31f at the upper surface side (i.e., in the optical axis direction or on a side opposite to opening 13). The total reflection surfaces 31a to 31f are inclined inner surfaces (which causes total internal reflection), and emit parallel light 3, which is perpendicular to the Z axis 12 and the optical axis 7a, to the peripheral portion 18 surrounding the Z axis 12. The emitting surfaces 15a to 15g of the circular arc portion of the optical element 11 have a curved surface having a lens function. Therefore, a cross-section of the optical element 11 taken along a direction along the optical axis direction 7a has a line or a curved surface at total reflection surfaces 31a to 31f of the reflecting portion, and the emitting surfaces 15a to 15g have a line or a curved surface.

Thus, with the optical device 10, light 7 emitted from the light source (LED) 6 can be efficiently and uniformly converted to a linear or quadrangular light distribution. Therefore, with the optical device 10, the illumination device 1 configured to more uniformly and brightly illuminate a linear or quadrangular region can be obtained.

While an example of the optical element 11 including the inner surface 16 in which the six first reflecting surfaces 31 are arranged is described above, five or less first reflecting surfaces 31 or seven or more first reflecting surfaces 31 may be arranged. The fan-shaped optical element 11 having a central angle (spreading angle) θ of 90 degrees is shown as an example, but the central angle θ may be smaller than 90 degrees, or greater than 90 degrees. In addition, the number of LEDs 6 arranged as a light source is not limited to 1, and a plurality of LEDs of many colors may be arranged as a light source. Further, the illumination device 1 may have a configuration in which a plurality of optical devices 10 including a plurality of optical elements 11, or a plurality of projection units 5 are arranged such that arrange Z axes 12 of the plurality of projection units 5 are arranged adjacent to each other or such that the plurality of projection units 5 have a common Z axis 12.

One of the aspects of the above is an optical device comprising: at least one first reflecting surface disposed so as to reflect at least a part of first light to an arc-shaped first region surrounding a first axis, the first light having a light distribution with an optical axis parallel to the first axis; and a second reflecting surface and a third reflecting surface that are disposed such that the second reflecting surface and the third reflecting surface meet each other on the first axis, and such that the at least one first reflecting surface is disposed between the second reflecting surface and the third reflecting surface. The at lease one first reflecting surface may be disposed in the arc-shaped first region and configured to reflect at least a part of first light to the arc-shaped first region surrounding the first axis. The at least one first reflecting surface may be configured in the arc-shaped first region at a peripheral portion around a first axis to reflect light having an optical axis parallel to the first axis in a direction orthogonal to the first axis. The second and third reflecting surfaces may be configured to meet each other on the first axis and the at least one first reflecting surface is disposed therebetween. The second reflecting surface and/or the third reflecting surface may be configured to meet the at least one first reflecting surface.

The at least one first reflecting surface may comprise a plurality of first reflecting surfaces separated from each other in a direction along the first axis. The first reflecting surface may have a set of a plurality of reflecting surfaces. The at least one first reflecting surface may be provided by or configured with an optical element. The optical element may be a light transmissive member. The optical device may include the optical element. The optical element may comprise the plurality of first reflecting surfaces, and a plurality of transmitting surfaces, each corresponding to a respective one of the plurality of first reflecting surfaces. The plurality of first reflecting surface and the plurality of transmitting surfaces may form a multi-stepped inner surface of the optical element. The optical member may have a sector-shaped cross-section in a plane perpendicular to the first axis. The optical element may comprise a plurality of emitting surfaces, each corresponding to a respective one of the plurality of first reflecting surfaces. Each of the plurality of emitting surfaces may comprise a portion that is curved in a cross-section taken in a direction along the first axis to form at least a part of convex surface. Each of the plurality of emitting surfaces comprises a portion that has a non-circular shape in a cross-section taken in a direction perpendicular to the first axis. The first light may be incident on the optical element along the first axis. The optical element may comprise, in a first end step that is located closest to the incident position of the multi-stepped inner surface, a surface that is configured to transmit a portion of the first light. The first end step (lowermost step) of the multi-stepped inner surface of the optical element may have an inner surface and an outer surface, and the inner surface and/or the outer surface of the first end step may be provided with an antireflection layer. The first step of the multi-stepped inner surface of the optical element may have an inner surface and an outer surface, and the inner surface and/or the outer surface of the first end step may be a surface that has been subjected to diffusion processing. The optical element may comprise end surfaces disposed at both ends in a rotating direction around the first axis, and the end surfaces are surfaces that have been subjected to antireflection or diffusion processing.

Another aspect of the above is an optical device comprising an optical element having a substantially sector shape in a plan view and including an opening at one end of a first axis perpendicular to the plane and a plurality of first reflecting surfaces, and second and third reflecting surfaces disposed so as to meet each other at the first axis, such that the optical element is disposed between the second and third reflecting surfaces. The optical element may comprise a plurality of transmitting surfaces. The plurality of transmitting surfaces may include a first transmitting surface, a second transmitting surface, and a third transmitting surface having sector-shapes with coaxial arcs. The first, second and third transmitting surfaces may be disposed in order from a side opposite to the opining. The first, second and third transmitting surfaces may be intermittently arranged in a direction along the first axis such that an inner diameter of the optical element increases stepwise toward the opening from the side opposite to the opening. The plurality of first reflecting surface may include a fourth reflecting surface, a fifth reflecting surface, and a sixth reflecting surface, each may be arc-shaped. The fourth, fifth and sixth reflecting surfaces may be disposed on the side opposite to the opining and inclined at an acute angle from the first, second and third transmitting surfaces, respectively.

Yet another aspect of the above is an optical device comprising at least one first reflecting surface that is disposed in an arc-shaped first region at a peripheral portion around a first axis and configured to reflect at least a part of light having an optical axis parallel to the first axis in a direction orthogonal to the first axis, and a second reflecting surface and a third reflecting surface that are disposed so as to meet each other at the first axis, such that the at least one first reflecting surface is disposed between the second reflecting surface and the third reflecting surface.

Yet another aspect of the above is an illumination device comprising the above optical device and a light source configured to output the first light having an optical axis parallel to the first so as to input or incident in the optical device. The optical axis of the light source may be offset from the first axis.

Yet another aspect of the above is an optical element comprising: (a) a substantially sector shape in a plan view; (b) an opening provided at one end of a first axis perpendicular to a plane having the substantially sector shape; (c) a first transmitting surface, a second transmitting surface, and a third transmitting surface having sector-shapes with coaxial arcs, wherein the first transmitting surface, the second transmitting surface, and the third transmitting surface are intermittently disposed along the first axis, and disposed stepwise toward the opening from a side opposite to the opening; and (d) a first reflecting surface, a second reflecting surface, and a third reflecting surface that are arc-shaped and are disposed on the side opposite to the opining and so as to be inclined at an acute angle from the first transmitting surface, the second transmitting surface, and the third transmitting surface, respectively. The first transmitting surface, the second transmitting surface, and the third transmitting surface may be arranged such that an inner diameter of the optical element increases stepwise toward the opening from the side opposite to the opening.

It is to be understood that although certain embodiments of the present invention have been described, various other embodiments and variants may occur to those skilled in the art that are within the scope and spirit of the invention, and such other embodiments and variants are intended to be covered by the following claims.

What is claimed is:

1. An optical device comprising:
    at least one first reflecting surface disposed so as to reflect at least a part of first light to an arc-shaped first region surrounding a first axis, the first light having a light distribution with an optical axis parallel to the first axis; and
    a second reflecting surface and a third reflecting surface that are disposed such that the second reflecting surface and the third reflecting surface meet each other on the first axis, and such that the at least one first reflecting surface is disposed between the second reflecting surface and the third reflecting surface.

2. The optical device according to claim 1, wherein the second reflecting surface and/or the third reflecting surface meets the at least one first reflecting surface.

3. The optical device according to claim 1, wherein the at least one first reflecting surface comprises a plurality of first reflecting surfaces separated from each other in a direction along the first axis.

4. The optical device according to claim 3, wherein:
    the optical device comprises an optical element that comprises:
        the plurality of first reflecting surfaces, and
        a plurality of transmitting surfaces, each corresponding to a respective one of the plurality of first reflecting surfaces,
        wherein the plurality of first reflecting surface and the plurality of transmitting surfaces form a multi-stepped inner surface of the optical element, and
    the optical member has a sector-shaped cross-section in a plane perpendicular to the first axis.

5. The optical device according to claim 4, wherein the optical element comprises a plurality of emitting surfaces, each corresponding to a respective one of the plurality of first reflecting surfaces.

6. The optical device according to claim 5, wherein each of the plurality of emitting surfaces comprises a portion that is curved in a cross-section taken in a direction along the first axis to form at least a part of convex surface.

7. The optical device according to claim 5, wherein each of the plurality of emitting surfaces comprises a portion that has a non-circular shape in a cross-section taken in a direction perpendicular to the first axis.

8. The optical device according to claim 4, wherein the first light is incident on the optical element along the first axis, and the optical element comprises, in a first end step located closest to an incident position of the multi-stepped inner, surface a surface that transmits a portion of the first light.

9. The optical device according to claim 8, wherein:
    the first end step of the multi-stepped inner surface of the optical element has an inner surface and an outer surface, and
    the inner surface and/or the outer surface of the first end step is provided with an antireflection layer.

10. The optical device according to claim 8, wherein the first end step of the multi-stepped inner surface of the optical element has an inner surface and an outer surface, and the inner surface and/or the outer surface of the first end step is a surface that has been subjected to diffusion processing.

11. The optical device according to claim 4, wherein the optical element comprises end surfaces disposed at both ends in a rotating direction around the first axis, and the end surfaces are surfaces that have been subjected to antireflection or diffusion processing.

12. An illumination device comprising:
the optical device according to claim 1; and
a light source configured to output the first light.

13. The illumination device according to claim 12, wherein the optical axis of the light source is offset from the first axis.

14. An optical device comprising:
an optical element having a substantially sector shape in a plan view and including an opening at one end of a first axis perpendicular to the plane and a plurality of first reflecting surfaces; and
second and third reflecting surfaces disposed so as to meet each other at the first axis, such that the optical element is disposed between the second and third reflecting surfaces,
wherein the optical element comprises:
a first transmitting surface, a second transmitting surface, and a third transmitting surface having sector-shapes with coaxial arcs in order from a side opposite to the opining, wherein the first transmitting surface, the second transmitting surface, and the third transmitting surface are intermittently arranged in a direction along the first axis such that an inner diameter of the optical element increases stepwise toward the opening from the side opposite to the opening, and
the plurality of first reflecting surfaces include a fourth reflecting surface, a fifth reflecting surface, and a sixth reflecting surface, each being arc-shaped and being disposed on the side opposite to the opining and inclined at an acute angle from the first transmitting surface, the second transmitting surface, and the third transmitting surface, respectively.

15. An illumination device comprising:
the optical device according to claim 14; and
a light source configured to output the first light.

16. The illumination device according to claim 15, wherein the optical axis of the light source is offset from the first axis.

17. An optical device comprising:
at least one first reflecting surface that is disposed in an arc-shaped first region at a peripheral portion around a first axis and configured to reflect at least a part of light having an optical axis parallel to the first axis in a direction orthogonal to the first axis; and
a second reflecting surface and a third reflecting surface that are disposed so as to meet each other at the first axis, such that the at least one first reflecting surface is disposed between the second reflecting surface and the third reflecting surface.

18. An illumination device comprising:
the optical device according to claim 17; and
a light source configured to output the light having an optical axis parallel to the first axis.

19. The illumination device according to claim 18, wherein the optical axis of the light source is offset from the first axis.

20. An optical element comprising:
a substantially sector shape in a plan view;
an opening provided at one end of a first axis perpendicular to a plane having the substantially sector shape;
a first surface, a second surface, and a third surface for transmitting that have sector-shapes with coaxial arcs, wherein the first surface, the second surface, and the third surface are intermittently disposed along the first axis, and disposed stepwise toward the opening from a side opposite to the opening; and
a fourth surface, a fifth surface, and a sixth surface for reflecting that are arc-shaped and are disposed on the side opposite to the opening such that the forth surface, the fifth surface, and the sixth surface are inclined at an acute angle from the first surface, the second surface, and the third surface, respectively.

21. The optical element according to claim 20, wherein the first surface, the second surface, and the third surface are arranged such that an inner diameter of the optical element increases stepwise toward the opening from the side opposite to the opening.

* * * * *